United States Patent
Ye et al.

(10) Patent No.: US 8,013,307 B2
(45) Date of Patent: Sep. 6, 2011

(54) TRUNCATION COMPENSATION ALGORITHM FOR ITERATIVE RECONSTRUCTION

(75) Inventors: Jinghan Ye, Fremont, CA (US); Mary K. Durbin, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1090 days.

(21) Appl. No.: 11/721,722

(22) PCT Filed: Dec. 5, 2005

(86) PCT No.: PCT/IB2005/054070
§ 371 (c)(1), (2), (4) Date: Jun. 14, 2007

(87) PCT Pub. No.: WO2006/064404
PCT Pub. Date: Jun. 22, 2006

(65) Prior Publication Data
US 2009/0310746 A1    Dec. 17, 2009

Related U.S. Application Data

(60) Provisional application No. 60/637,186, filed on Dec. 17, 2004.

(51) Int. Cl.
*G01T 1/161* (2006.01)
*G01T 1/166* (2006.01)
(52) U.S. Cl. ............... 250/363.04; 250/363.08; 382/131
(58) Field of Classification Search ............. 250/363.04, 250/363.03, 370.08; 382/131, 275; 378/4
See application file for complete search history.

(56) References Cited

U.S. PATENT DOCUMENTS

| | | | |
|---|---|---|---|
| 5,210,421 A | 5/1993 | Gullberg et al. | |
| 5,752,916 A | 5/1998 | Guerard et al. | |
| 6,310,968 B1 | 10/2001 | Hawkins et al. | |
| 6,339,652 B1 | 1/2002 | Hawkins et al. | |
| 6,539,103 B1 * | 3/2003 | Panin et al. | 382/131 |
| 6,768,782 B1 * | 7/2004 | Hsieh et al. | 378/8 |
| 7,173,248 B2 * | 2/2007 | Ross et al. | 250/363.03 |
| 2003/0190065 A1 * | 10/2003 | Hamill et al. | 382/131 |
| 2004/0030246 A1 | 2/2004 | Townsend et al. | |

(Continued)

FOREIGN PATENT DOCUMENTS
WO    0025268 A2    5/2000

OTHER PUBLICATIONS

"Reconstruction of object-specific attenuation map for quantitative SPECT" by Zhengrong Liang; Jinghan Ye; 1993 IEEE Conference Record. Nuclear Science Symposium and Medical Imaging Conference (Cat. No. 93CH3374-6) pp. 1231-1235.*

(Continued)

*Primary Examiner* — David Porta
*Assistant Examiner* — Jessica L Eley

(57) ABSTRACT

An imaging system (10) includes at least one radiation detector (20) disposed adjacent a subject receiving aperture (18) to detect and measure at least one of emission and transmission radiation from a subject, the detector (20) at a plurality of projection angles. A processor (64) determines which radiation data belong to a field of view of the radiation detector (20) at each projection angle. An image processor (70, 72) iteratively reconstructs the radiation detected only in the determined field of view into image representations. Truncated data is compensated by supplying the untruncated data from the projections taken at different angles at which the truncated data is untruncated.

20 Claims, 5 Drawing Sheets

U.S. PATENT DOCUMENTS

2004/0066909 A1    4/2004  Lonn et al.

OTHER PUBLICATIONS

5299248, Mar. 29, 1994, Pelc, withdrawn.

Case, J. A., et al.; Reduction of Truncation Artifacts in Fan Beam Transmission Imaging Using a Spatially Varying Gamma Prior; 1995; IEEE Trans. on Nuclear Science; 42(6)2260-2265.

Guillemaud, R., et al.; Truncation Artifact Correction of Attenuation Map with Iterative and Model Based Reconstruction; 1995; IEEE Nuclear Science Symposium and Medical Imaging Conf. Record; vol. 2: 1212-1216.

Hutton, B. F.; An introduction to iterative reconstruction; 2002; ALASBIMN; vol. 5, No. 18.

Pan, T-S., et al.; Segmentation of the Body and Lungs from Compton Scatter and Photopeak Window Data in SPECT: A Monte-Carlo Investigation; 1996; IEEE Trans. on Medical Imaging; 15(1)13-24.

Riddell, C., et al.; Iterative Reprojection Reconstruction Algorithm with Attenuation Correction Applied to Truncated Projections in SPECT; 1992; Proc. of Annual Int'l. Conf. of the Engineering in Medicine & Biology Society; vol. 5, Conf. 14; pp. 1818-1820.

Tan, P., et al.; A Scanning Line Source for Simultaneous Emission and Transmission Measurements in SPECT; 1993; J. of Nuclear Medicine; 34(10)1752-1760.

Gullberg, G. T.; Innovative Design Concepts for Transmission CT in Attenuation-Corrected SPECT Imaging; 1998; J. Nuclear Medicine; 39(8)1344-1347.

* cited by examiner

TRUNCATION COMPENSATION ALGORITHM FOR ITERATIVE RECONSTRUCTION

CROSS REFERENCE TO RELATED APPLICATIONS

This application claims the benefit of U.S. provisional application Ser. No. 60/637,186 filed Dec. 17, 2004, which is incorporated herein by reference.

The present invention relates to the diagnostic imaging systems and methods. It finds particular application in conjunction with the Single Photon Emission Tomography (SPECT) systems with attenuation compensation and shall be described with particular reference thereto. It will be appreciated that the invention is also applicable to other imaging systems such as Positron Emission Tomography systems (PET), Computed Tomography systems (CT), and the like.

Nuclear medicine imaging employs a source of radioactivity to image a patient. Typically, a radiopharmaceutical is injected into the patient. Radiopharmaceutical compounds contain a radioisotope that undergoes gamma-ray decay at a predictable rate and characteristic energy. One or more radiation detectors are placed adjacent to the patient to monitor and record emitted radiation. Sometimes, the detector is rotated or indexed around the patient to monitor the emitted radiation from a plurality of directions. Based on information such as detected position and energy, the radiopharmaceutical distribution in the body is determined and an image of the distribution is reconstructed to study the circulatory system, radiopharmaceutical uptake in selected organs or tissue, and the like.

Typically, in the iterative reconstruction technique, each time a new volume estimate of the reconstructed data is generated, the previously reconstructed volume of image data is forward projected onto the plane of the detector. The forward projected data is compared to the actual projection data. If the reconstructed image were perfect, these two projections of data would match and there would be no difference. However, as the image is being built, there typically is a difference or error. The error or its inverse is then backprojected into the image volume to correct the volumetric image.

Although these techniques work well, they are prone to truncation errors. That is, when the object is not seen completely by the detector in all detector positions, data for reconstructing some of the voxels appears only in some of the views. Thus, the data in the primary region of interest is typically fully sampled; whereas, surrounding tissue is less densely sampled or sampled in only a fraction of the views. In each iterative cycle, the backprojected error values span the entire image volume, including the fully sampled and under sampled regions. Allowing backprojection of error values from a comparison in which no data was present in the detector for the comparison leads to errors and artifacts, such as object clipping, in the less densely sampled regions.

The present invention provides a new and improved imaging apparatus and method which overcomes the above-referenced problems and others.

In accordance with one aspect of the present invention, an imaging system is disclosed. At least one radiation detector is disposed adjacent a subject receiving aperture to detect and measure at least one of emission and transmission radiation from a subject, the detector being movable around the subject to receive the radiation and generating measured projection data at a plurality of projection angles. A field-of-view (FOV) means determines a plurality of pixels which belongs to a field of view of the radiation detector at each projection angle. An image processor iteratively reconstructs the radiation detected only in the field of view into image representations. The image representations are iteratively reconstructed in an image memory.

In accordance with another aspect of the present invention, a method of imaging is disclosed. At least one of emission and transmission radiation from a subject at a plurality of projection angles is detected and measured. Measured projection data is generated at the plurality of projection angles. A plurality of pixels which belongs to a field of view is determined, within which the radiation is detected by a radiation detector at each projection angle. The radiation detected in the field of view is iteratively reconstructed into image representations in an image memory.

One advantage of the present invention resides in reduced artifacts.

Another advantage resides in reduced clipping in reconstructed images.

Another advantage resides in reduced blurring in reconstructed images.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

Figure 3:
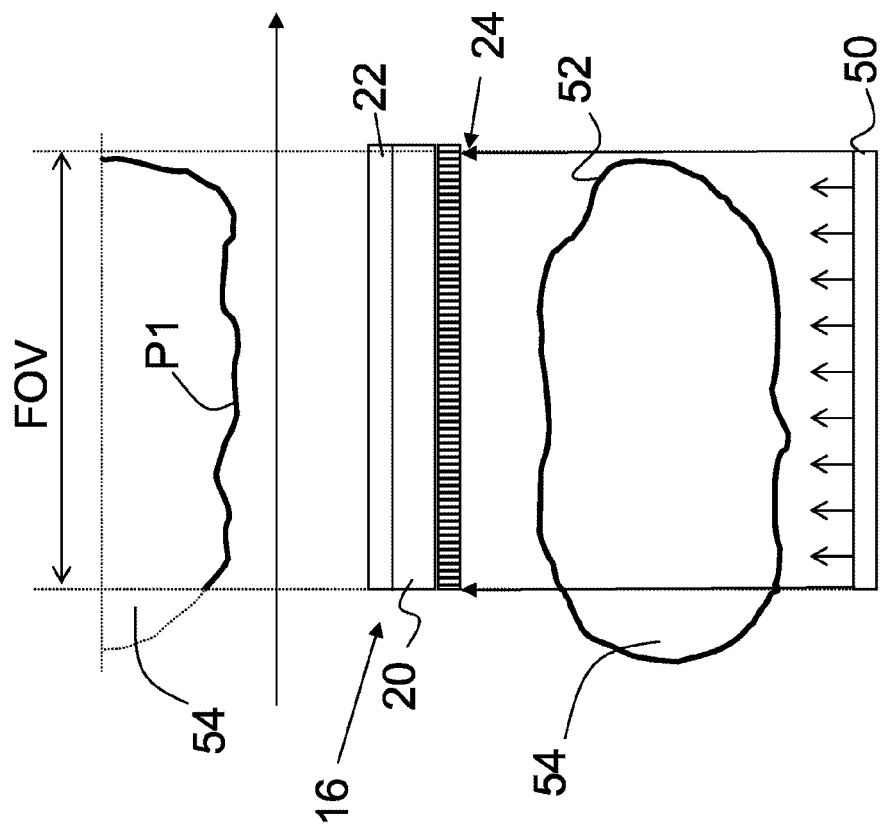
Figure 4:
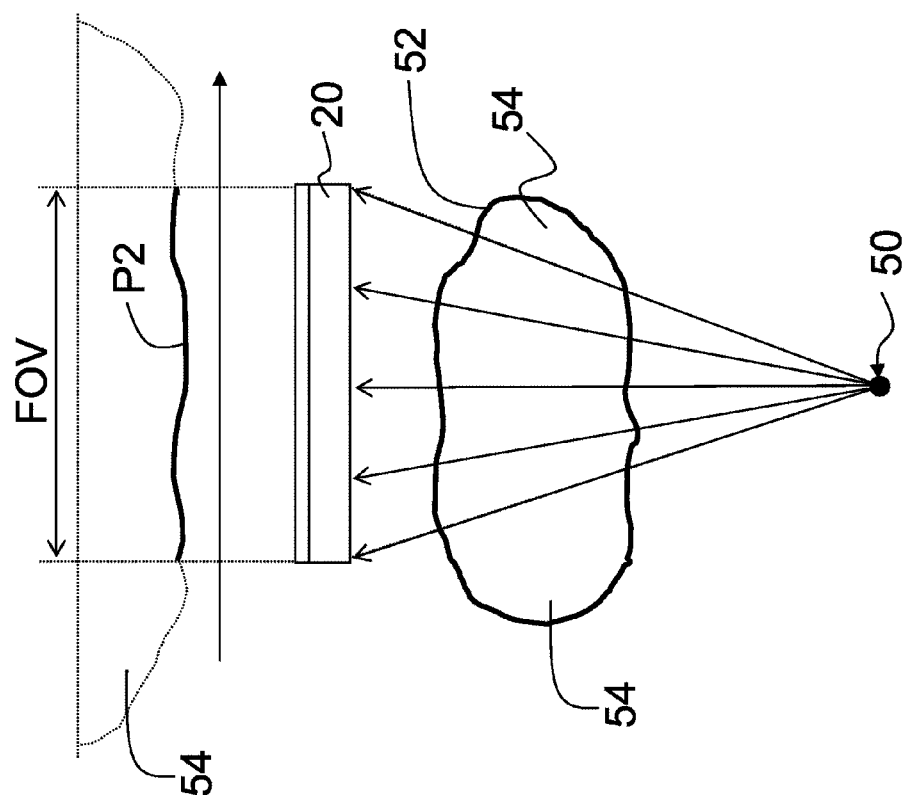
Figure 5:
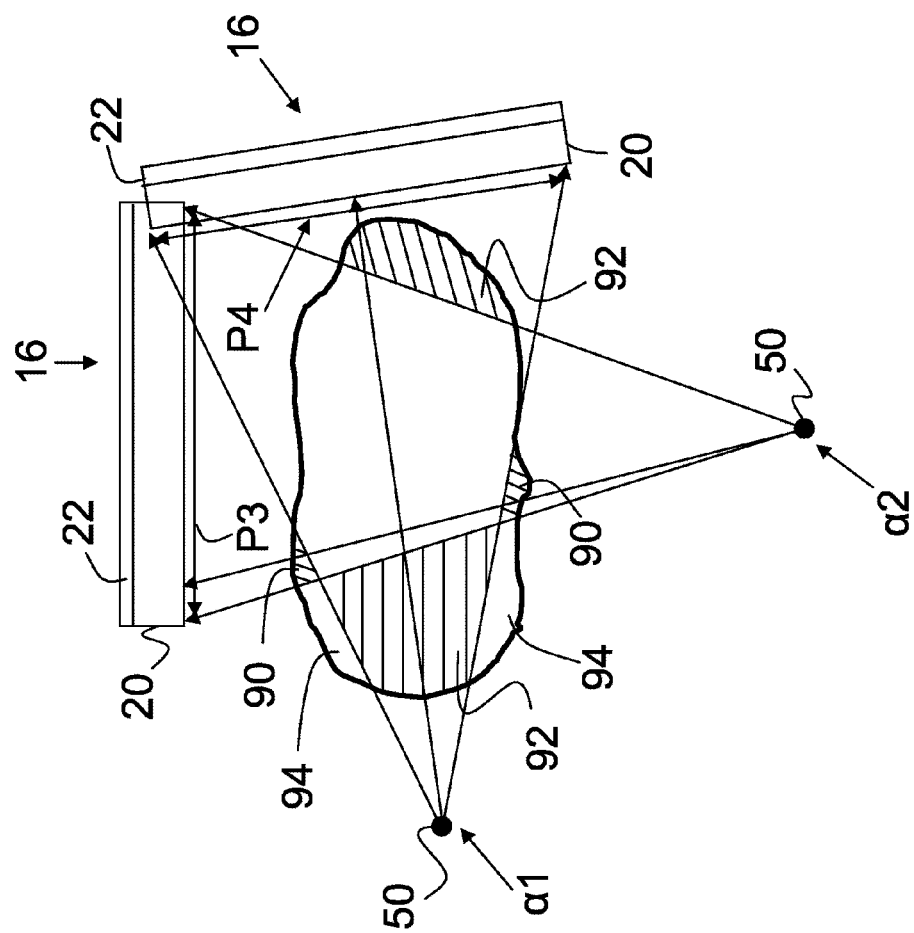

FIG. 3 diagrammatically shows a truncation at one side of a subject with parallel bore collimation;

FIG. 4 diagrammatically shows a truncation at one side of a subject with magnifying or fanbeam collimation; and FIG. 5 diagrammatically shows truncation parts that are outside of the field of view of a first angular position of a detector, but within the field of view of a second angular position of the detector.

Figure 1:
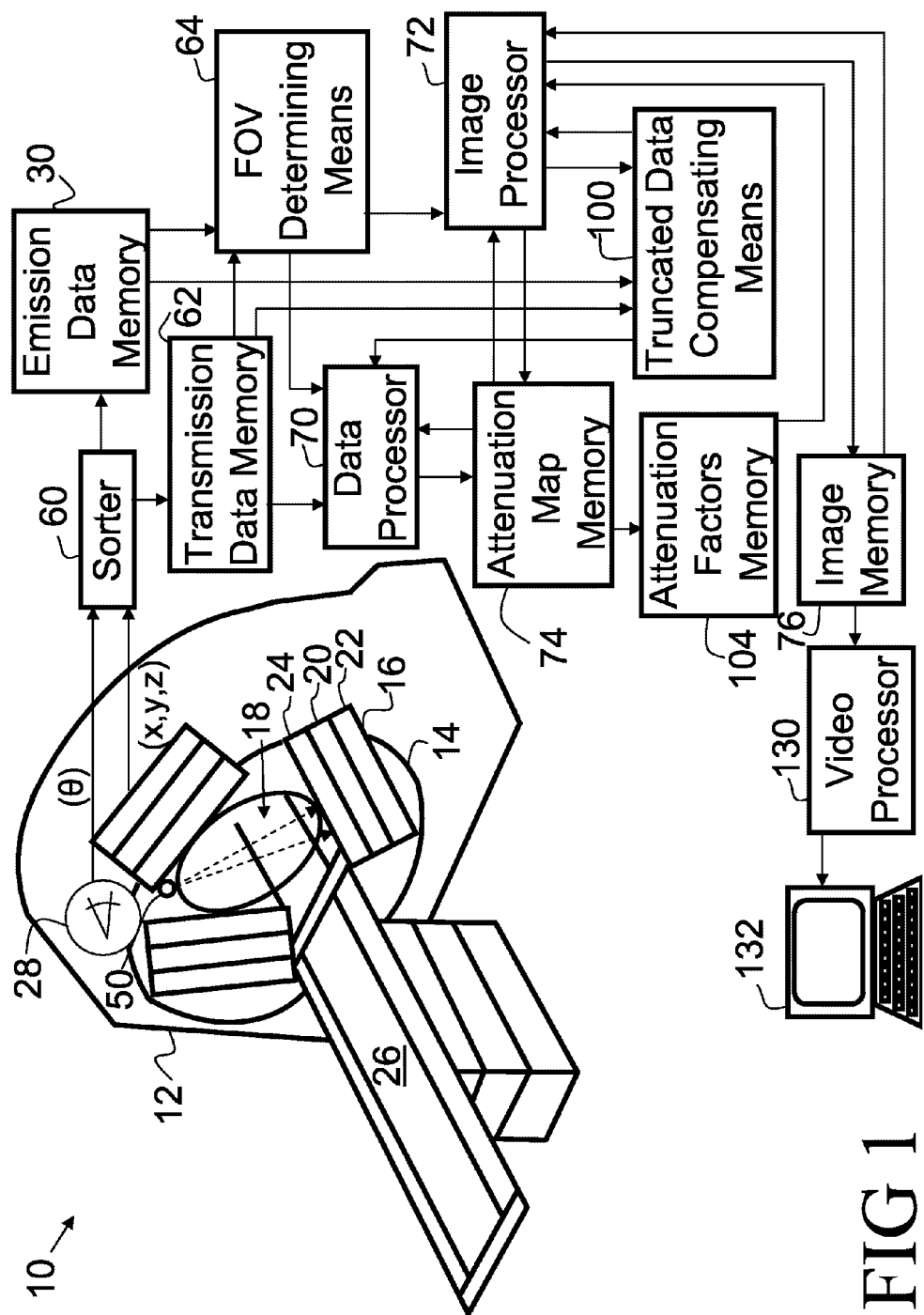
FIG. 1 is a diagrammatic illustration of an imaging system.

With reference to FIG. 1, a nuclear imaging system 10 typically includes a stationary gantry 12 that supports a rotatable gantry 14. One or more detection heads 16 are carried by the rotatable gantry 14 to detect radiation events emanating from a region of interest or examination region 18. Each detection head includes two-dimensional arrays of detector elements or detector 20 such as a scintillator and light sensitive elements, e.g. photomultiplier tubes, photodiodes, and the like. Direct x-ray to electrical converters, such as CZT elements, are also contemplated. Each head 16 includes circuitry 22 for converting each radiation response into a digital signal indicative of its location (x, y) on the detector face and its energy (z). The location of an event on the detector 20 is resolved and/or determined in a two dimensional (2D) Cartesian coordinate system with nominally termed x and y coordinates. However, other coordinate systems are contemplated. A collimator 24 controls the direction and angular spread, from which each element of the detector 20 can receive radiation, i.e., the detector 20 can receive radiation only along known rays. Thus, the determined location on the detector 20 at which radiation is detected and the angular position of the camera 16 define the nominal ray along which each radiation event occurred.

Typically, an object to be imaged is injected with one or more radiopharmaceuticals or radioisotopes and placed in the examination region 18 supported by a couch 26. Few examples of such isotopes are Tc-99m, Ga-67, and In-111.

The presence of the radiopharmaceuticals within the object produces emission radiation from the object. Radiation is detected by the detection heads 16 which are able to be angularly indexed or rotated around the examination region 18 to collect the projection emission data at one or more selected projection directions. The projection emission data, e.g. the location (x, y), energy (z), and an angular position (θ) of each detection head 16 around the examination region 18 (e.g., obtained from an angular position resolver 28) are stored in an emission data memory 30.

As the emission data normally contains inaccuracies caused by varying absorption characteristics of the patient's anatomy, often the transmission radiation source is utilized to provide additional attenuation information to correct the emission data. In one embodiment, one or more radiation sources 50 are mounted across the examination region 18 from the detection heads 16. Optionally, the radiation sources 50 are mounted between the detection heads 16 or to the detection heads 16 such that transmission radiation from the radiation sources 50 is directed toward and received by corresponding detection head(s) 16 on an opposite side of the examination region 18 to complement the emission data. Preferably, the collimators 24 collimate the transmission radiation. E.g., the collimators 24 restrict the scintillator 20 from receiving those portions of transmission radiation not traveling along rays normal (for parallel beam configurations) to the detector 20 or other direct path between the source and the detector. Alternately, other collimation geometries are employed and/or the collimation may take place at the source.

Preferably, the radiation source(s) 50 are line sources each extending the axial length of the respective detection heads 16 to which they correspond. Preferably, the line sources take the form of thin steel tubes filled with radionuclides and sealed at their ends. Alternately, the radiation sources 50 can also be bar sources, point sources, flat rectangular sources, disk sources, flood sources, a tube or vessel filled with radionuclides, or active radiation generators such as x-ray tubes.

With continuing reference to FIG. 1 and further reference to FIGS. 3-4, a transmission scan is performed such that transmission radiation from the transmission radiation source(s) 50 is also received by the detection head(s) 16, and transmission projection data is generated. Typically, emission projection data is collected concurrently, but at different energy. The transmission and emission data are often truncated as the size of an object 52 is typically bigger than the field of view of the detector 20, resulting in truncated projections P1, P2. Truncated parts 54 of the object 52 which are not included in the field of view of the detector 20 are clipped off. As will be discussed in a greater detail below, the truncated parts 54 are compensated for from the projections taken at other angles at which the truncated parts 54 are not truncated.

A sorter 60 sorts the emission projection data and transmission projection data on the basis of their relative energies. The emission data is stored in the emission data memory 30 and the transmission data is stored in a transmission memory 62. A FOV determining means 64 determines which data are collected in the field of view of a corresponding detector 20 by one of the methods well known in the art as will be discussed in a greater detail below.

Figure 2:
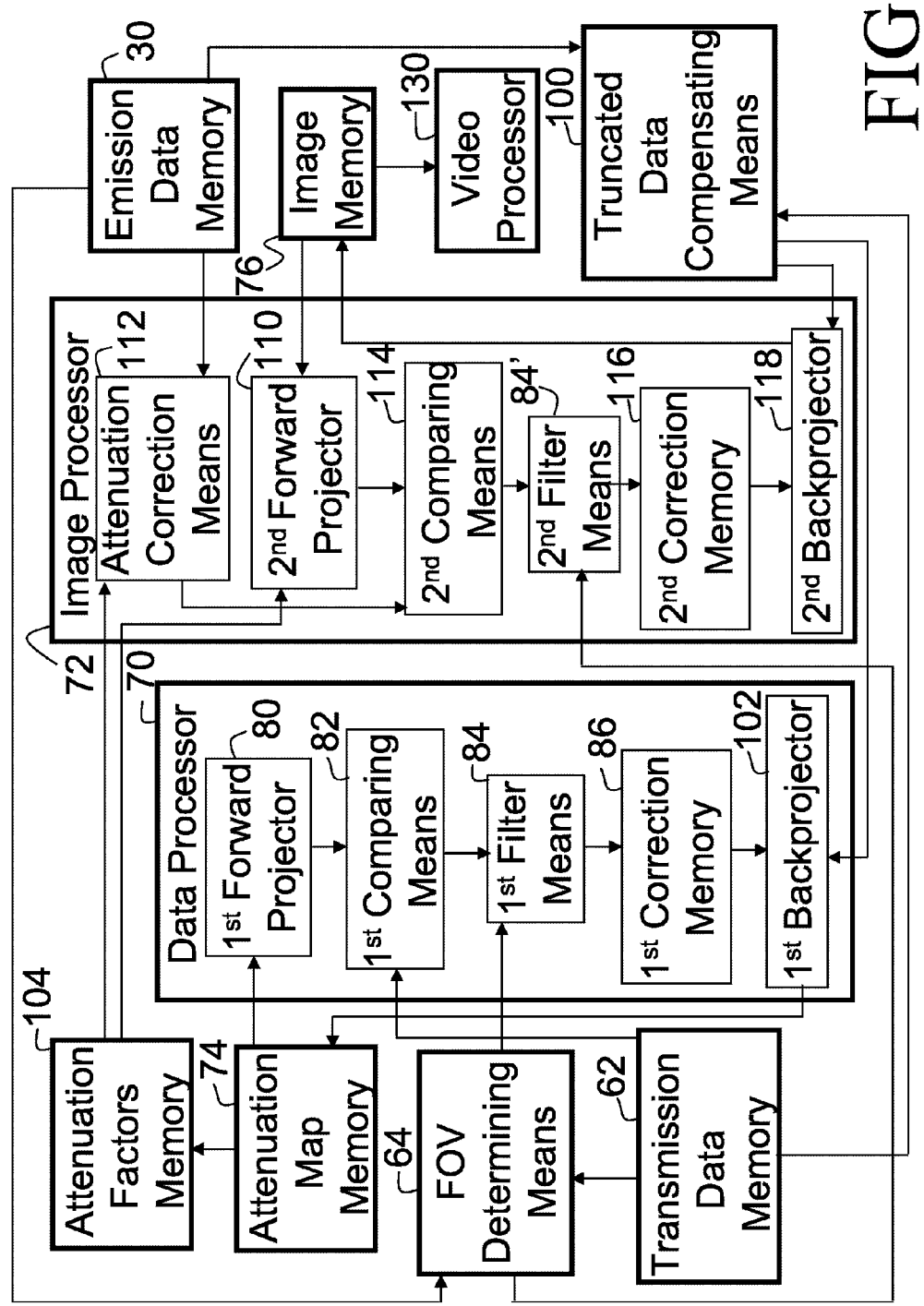
FIG. 2 is a diagrammatic illustration of a portion of the imaging system in detail.

With continuing reference to FIG. 1 and further reference to FIG. 2, a data processor 70 iteratively reconstructs a 3D transmission radiation image or attenuation map 74 from the FOV transmission data while an image processor 72 iteratively reconstructs a 3D emission image from the FOV emission data.

Preferably, the data processor 70 executes an iterative Bayesian Iterative Transmission Gradient Algorithm (BITGA), while the image processor 72 executes a Maximum Likelihood Expectation Maximization Algorithm (MLEM). In preparation for the first iteration of the reconstruction process, an attenuation map memory 74 and an image memory 76 are initialized by loading the memories 74, 76 with assumed or first estimates of the attenuation map and the emission maps. The first estimate for the attenuation map is optionally characterized by a uniform attenuation value inside a predetermined contour which contains the subject and zero outside the contour. Likewise, the first emission maps estimate is optionally characterized by a uniform value inside the contour and zero outside. Alternately, the availability of additional a priori information allows for more accurate first estimates.

A first forward projector 80 creates projection transmission data from the transmission attenuation map 74. A first comparing means 82 compares the measured transmission data with the forward projected data to determine correction factors. The FOV determining means 64 determines if any part of the object is bigger than the field of view by one of the methods known in the art. E.g., the FOV determining means 64 determines whether some pixels were forced to zero values. Preferably, a series of reference scans is generated, from which the field of view is determined. Alternatively, the FOV determining means 64 searches each line in the normalized transmission projection data from an edge to a center to determine a sharp change in values between adjacent pixels. If the difference between a current pixel and a previous pixel is greater than a prespecified threshold, the FOV determining means 64 concludes that there exists a truncation. A filter means 84 excludes all pixels beyond determined point of truncation from the correction factors matrix by filtering the out of the field of view data. E.g. the next iteration of reconstructed data is not corrected erroneously with values from outside the FOV. The correction factors that correspond to the field of view are stored in a first correction memory 86.

With continuing reference to FIGS. 1 and 2 and further reference to FIG. 5, while taking projections at a first angular positional, first truncated parts 90 are not detected by a projection P4, but the first parts 90 is detected by a projection P3 which is taken at a second angular position α2. Likewise, while the projections are taken at the second angular position α2, second truncated parts 92 are not detected by the projection P3, the second truncated parts 92 are detected by the projection P4 which is taken at the first angular positional. Parts 94 are truncated in both illustrated projections P3 and P4. A truncated data compensating means 100 supplies data of untruncated projections taken at different angular positions to compensate for the truncated parts 90, 92 outside of the field of view FOV. A first backprojector 102 backprojects the correction factors into the attenuation map memory 74. The back projection (of non zero values) is limited to the region for which actual data P1, P2 was collected. The elements of the attenuation map 74 represent the attenuation factors of the respective voxels that are stored in an attenuation factors memory 104.

With continuing reference to FIGS. 1 and 2, the image processor 72 iteratively reconstructs 3D image representation in the image memory 76 with each iteration including a forward projection operation and a backprojection operation. A second forward projector 110 creates projection emission data from the reconstructed emission image stored in the image memory 76. More specifically, for each ray along which emission data is received, the second forward projector 110 calculates the projection of a corresponding ray through the transmission attenuation factors stored in the attenuation factors memory 104. An attenuation correction means 112 adjusts the received emission data to compensate for the attenuation factor projection along the same ray. A second comparing means 114 compares the attenuation corrected measured emission data along the ray with the forward projected data along the same ray to determine correction factors. A filter means 84' excludes all pixels beyond determined point of truncation from the reconstruction by filtering the out of the field of view data. The correction factors which correspond to the field of view are stored in a second correction memory 116. A second backprojector 118 backprojects the correction factors into the reconstructed image, that is the reconstructed image is updated with the correction factors. The truncated data compensating means 100 supplies data of untruncated projections taken at different angular positions to compensate for the truncated parts 90, 92 outside of the field of view FOV. Any determined corrections for areas outside the field of view are discarded.

In one embodiment, the truncated data compensating means 100 applies a priori knowledge to the algorithm to smooth boundaries at the truncated side in the reconstructed image. Some pixels in the reconstructed image may "see" the detector FOV in only a few projection angles if the projection is highly truncated. In this case, some fuzziness is created at the truncated side in the reconstructed image. Applying a priori knowledge to the algorithm helps to alleviate the fuzziness at the truncated side by forcing to zero values those pixels in the reconstructed object that are confirmed to be outside of the field of view.

Of course, it is also contemplated that the data processor 70 and the image processor 72 execute other iterative algorithms including both transmission and emission iterative algorithms as well as a variety of other gradient and non gradient iterative algorithms. Each successive iteration is performed with the most recently updated emission image. When the reconstructed emission data and the measured emission data converge, i.e. the corrections fall below a preselected level, the iterative reconstruction process ends.

In one embodiment, a population of a priori images (i.e., a "knowledge set") is collected. The a priori images may not be from the patient currently under examination but rather be cross-sections of a similar structure such as images of other subjects obtained from CT scans, PET transmission scans, other SPECT transmission scans, and the like. As another option, the initial a priori image may be of the same subject but taken with a different modality.

A video processor 130 retrieves slices, projections, 3D renderings, and other image information from the 3D image memory 76 and appropriately formats an image representation for display on one or more human viewable displays, such as a video monitor 132, printer, storage media, or the like. If the video processor repeatedly retrieves the selected image formation during reconstruction, the display will become clearer with each iteration as the reconstructed image converges on a final image.

With continuing reference to FIGS. 1 and 2, the Iterative Transmission Gradient Algorithm can be expressed as:

$$\mu_j^{n+1} = \mu_j^n \frac{\sum_i f_i \exp\left(-\sum_{k \in K_{i,j}} \mu_k^n l_{i,k}\right) l_{i,j}}{\sum_i Y_i l_{i,j}} \quad (1)$$

where
$\mu_j^n$ is the attenuation coefficient at the jth pixel and the nth iteration,
$f_i$ is the reference scan value at the ith detector,
$l_{i,j}$ is the length of the segment of the ray extending from the ith detector within the jth pixel,
$K_{i,j}$ is the set of pixels from the jth detector to the ith detector, and
$Y_i$ is the transmission counts at the ith detector.

The Bayesian Iterative Transmission Gradient Algorithm (BITGA) which includes a spatially varying gamma prior can be expressed as:

$$\mu_j^{n+1} = a_j \left[ \mu_j^n \frac{\sum_i f_i \exp\left(-\sum_{k \in K_{i,j}} \mu_k^n l_{i,k}\right) l_{i,j}}{\sum_i Y_i l_{i,j}} \right] + [1 - a_j] r_j$$

where $r_j$ is value "preferred" pixel value, and $a_j$ is its weight.

Preferably, the Bayesian Iterative Transmission Gradient Algorithm includes a modified prior block which uses a priori knowledge to encourage the each pixel's value to converge either to the attenuation coefficient of water, e.g. tissue, or air, e.g. air in the lungs:

$$r_j = \mu(ST)$$

$$a_j = a_0 \exp\left(-\left(\frac{\mu_j - \mu(ST)}{\delta}\right)^2\right)$$

where $\delta$ defines the extent of the prior.

Typically, the detector matrix covers a larger area than the actual detector field-of-view. The pixels which are located in the truncated parts 54 outside the FOV in the detector matrix are forced to zero values and are clipped off by the FOV determining means 64 as it is discussed above. All pixels beyond determined point of truncation are not included in the reconstruction, e.g. the projection data is truncated to exclude erroneous zero values from the reconstruction.

The modified Bayesian Iterative Transmission Gradient Algorithm which reconstructs pixels only from the field of view can be expressed as:

$$\mu_j^{n+1} = \mu_j^n \frac{\sum_{i \in FOV} f_i \exp\left(-\sum_{k \in K_{i,j}} \mu_k^n l_{i,k}\right) l_{i,j}}{\sum_{i \in FOV} Y_i l_{i,j}} + [1 - a_j] * r_j \quad (2)$$

Of course, the projection data is not truncated if the object is small enough so that no events fall outside the detector FOV.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An imaging system comprising:
   at least one radiation detector disposed adjacent a subject to detect and measure at least one of emission and transmission radiation from a subject, the detector being movable around the subject to receive the radiation and generate measured projection data at a plurality of projection angles;
   a FOV means for determining a plurality of pixels which belongs to a field of view of the radiation detector at each projection angle;

an image processor which iteratively reconstructs the radiation detected only in the field of view into image representations, the image processor including:
  a forward projector which projects the image representations from the corresponding image memory;
  a means for comparing the forward projected image representations with the measured projection data and, based on the comparison, determining a set of correction factors; and
  a backprojector for backprojecting the correction factors, which correspond only to the pixels within the determined field of view, into the image representations; and
an image memory in which the image representations are iteratively reconstructed.

2. The system as set forth in claim 1, wherein the image processor further includes:
a filter means for removing the out of the field of view data prior to back projecting correction factors.

3. The system as set forth in claim 2, wherein the backprojector does not back project the outside of the field of view pixels.

4. The system as set forth in claim 1, further including:
a means for compensating for truncated data by at least one of:
  supplying the untruncated data from the projections taken at different angles at which the truncated data is untruncated, and
  using a priori knowledge.

5. The system as set forth in claim 1, wherein the image processor executes at least one of:
an iterative transmission reconstruction gradient algorithm;
an iterative transmission reconstruction non gradient algorithm;
an iterative emission reconstruction gradient algorithm; and
an iterative emission reconstruction non gradient algorithm.

6. The system as set forth in claim 5, wherein the image processor executes an Iterative Transmission Gradient Algorithm, wherein the out of the field of view pixels are excluded from the reconstruction:

$$\mu_j^{n+1} = \mu_j^n \frac{\sum_{i \in FOV} f_i \exp\left(-\sum_{k \in K_{i,j}} \mu_k^n l_{i,k}\right) l_{i,j}}{\sum_{i \in FOV} Y_i l_{i,j}}$$

where
  $\mu_j^n$ is the attenuation coefficient at a jth pixel and the nth iteration,
  $f_i$ is a reference scan value at an ith detector,
  $l_{i,j}$ is a length of a segment of a ray extending from the ith detector within the jth pixel,
  $K_{i,j}$ is a set of pixels from the jth detector to the ith detector, and
  $Y_i$ is transmission counts at the ith detector.

7. The system as set forth in claim 6, further including:
a means for compensating for truncated data which compensating means uses a priori knowledge to reconfirm the out of the field of view pixels and force the reconfirmed out of the field of view pixels to zero values in the reconstructed image.

8. The system as set forth in claim 1, further including:
at least one of a PET scanner and a SPECT scanner to detect emission projections from the subject.

9. The system of claim 1, where the measured projection data used in the comparison is attenuation corrected measured emission data.

10. A method of imaging comprising:
detecting and measuring at least one of emission and transmission radiation from a subject at a plurality of projection angles;
generating measured projection data at the plurality of projection angles;
determining a plurality of pixels which belongs to a field of view within which the radiation is detected by a radiation detector at each projection angle; and
iteratively reconstructing the radiation detected in the field of view into image representations in an image memory, including:
  forward projecting the image representations;
  comparing the forward projected image representations with the measured projection data;
  based on the comparison, determining a set of correction factors; and
  backprojecting the correction factors, which correspond only to the pixels within the determined field of view, into the image representations.

11. The method as set forth in claim 10, wherein the step of reconstruction further includes:
removing the out of the field of view data prior to back projecting.

12. The method as set forth in claim 10, wherein the step of determining the plurality of pixels includes:
generating reference scans.

13. The method as set forth in claim 10, further including:
compensating for truncated data by at least one of:
supplying an untruncated data from other projections, and
using a priori knowledge.

14. The method as set forth in claim 10, wherein the step of reconstruction includes executing at least one of:
an iterative transmission reconstruction gradient algorithm;
an iterative transmission reconstruction non gradient algorithm;
an iterative emission reconstruction gradient algorithm; and
an iterative emission reconstruction non gradient algorithm.

15. The method as set forth in claim 14, wherein the step of reconstruction further includes:
executing an Iterative Transmission Gradient Algorithm, wherein the out of the field of view pixels are excluded from the reconstruction:

$$\mu_j^{n+1} = \mu_j^n \frac{\sum_{i \in FOV} f_i \exp\left(-\sum_{k \in K_{i,j}} \mu_k^n l_{i,k}\right) l_{i,j}}{\sum_{i \in FOV} Y_i l_{i,j}}$$

where
  $\mu_j^n$ is the attenuation coefficient at a jth pixel and the nth iteration,
  $f_i$ is a reference scan value at an ith detector,
  $l_{i,j}$ is a length of a segment of a ray extending from the ith detector within the jth pixel,
  $K_{i,j}$ is a set of pixels from the jth detector to the ith detector, and
  $Y_i$ is transmission counts at the ith detector.

16. The method as set forth in claim 15, further including:
reconfirming the out of the field of view pixels by using a priori knowledge, and forcing the reconfirmed out of the field of view pixels to zero values in the reconstructed image.

17. At least one of a PET scanner and SPECT scanner which performs the method of claim 10.

18. The method of claim 10, where the measured projection data used in the comparison is attenuation corrected measured emission data.

19. A diagnostic imaging system including:
an emission memory which stores measured emission projections from a subject which projections are detected by a radiation detector;
a transmission memory which stores measured transmission data from the subject which data are detected by the radiation detector;
a processor which determines a field of view of the radiation detector;
an attenuation map memory which stores transmission attenuation maps;
an image memory which stores emission maps;
a processor which is programmed to perform steps of:
   (a) generating the transmission attenuation maps via forward projecting the transmission attenuation maps from the attenuation map memory,
   (b) comparing the projected transmission attenuation maps with the transmission data,
   (c) based on the comparison, determining a set of correction factors,
   (d) backprojecting the correction factors, which correspond only to the data within the determined field of view, into the transmission attenuation maps of the attenuation map memory; and
   (e) iteratively repeating steps (a) through (d) until the projected transmission attenuation maps converge with the transmission data.

20. The system as set forth in claim 19, further including:
a processor which is programmed to perform steps of:
   (f) generating the emission maps via forward projecting the emission maps from the image memory,
   (g) correcting the projected emission data with the attenuation correction factors calculated from the attenuation maps,
   (h) correcting the measured emission projections with the attenuation correction factors calculated from the attenuation maps,
   (i) comparing the projected emission data with the measured emission data,
   (j) based on the comparison, determining a set of correction factors,
   (k) backprojecting the correction factors, which correspond only to the data within the determined field of view, into the emission maps of the image memory, and
   (l) iteratively repeating steps (f) through (k) until the attenuation corrected projected emission data converges with the measured emission data; and
a human viewable display which renders reconstructed image representations from the emission maps.

* * * * *